A. W. KEELER AND JACOB ECKERT, OF LAFAYETTE, NEW YORK.

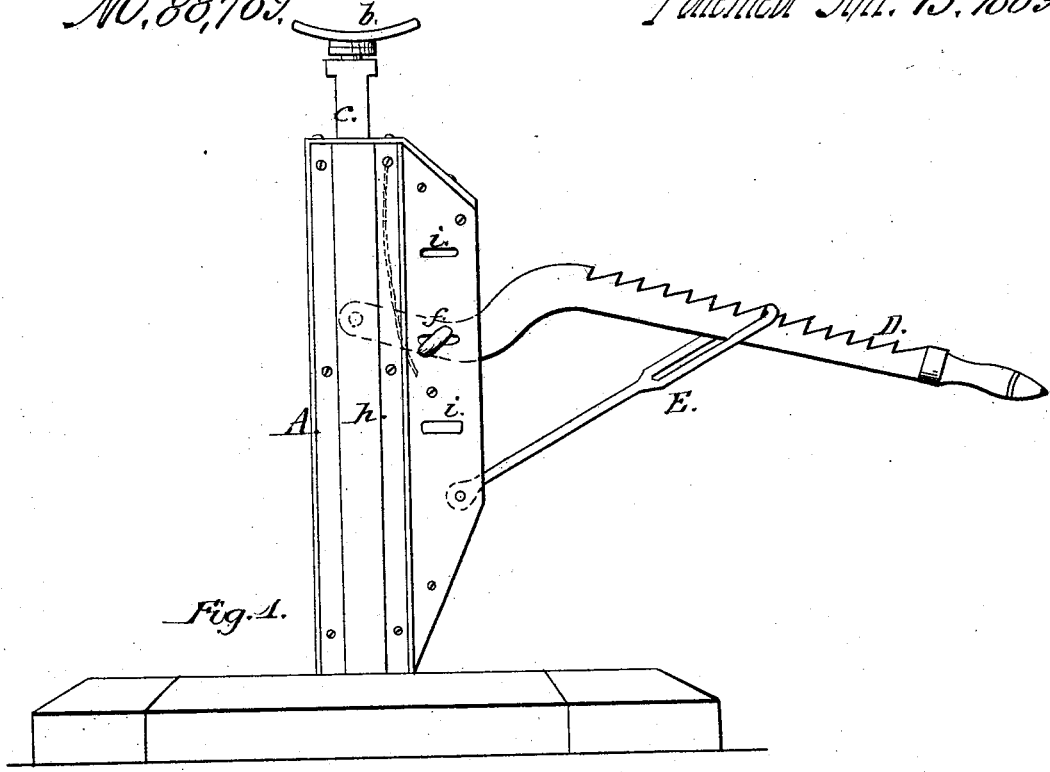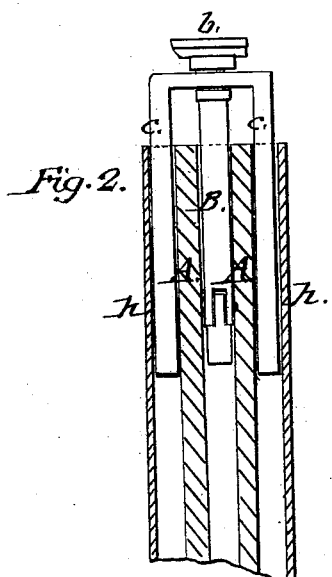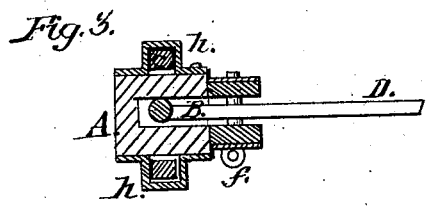

Letters Patent No. 88,789, dated April 13, 1869.

IMPROVED CARRIAGE-JACK.

The Schedule referred to in these Letters Patent and making part of the same.

*To all whom it may concern:*

Be it known that we, A. W. KEELER and JACOB ECKERT, of Lafayette, in the county of Onondaga, and State of New York, have invented a new and improved Wagon-Jack; and we do hereby declare that the following is a full, clear, and exact description thereof, which will enable those skilled in the art to make and use the same, reference being had to the accompanying drawings, forming part of this specification, in which—

Figure 1 is a side view of our invention;

Figure 2 is a vertical cross-section of the standard; and

Figure 3 is a horizontal section of the same.

Similar letters of reference indicate like parts in all the figures.

In the accompanying drawings—

A is the standard;

B is the lifting-rod, having a seat, $b$, upon its upper end, for the wagon-axle;

$c\ c$ is a guide;

D is the operating-lever; and

F is the pawl.

The lifting-rod B is pivoted to the operating-lever, and slides vertically in the standard A, and is steadied by a sliding guide, which is made with two legs, (as shown by $c\ c$, figs. 2 and 3,) which straddle the main standard A, and work in sheet-metal boxes $h\ h$, attached to the sides of the standard.

This guide $c\ c$ makes a stiff support for the lifting-rod, and prevents it from being strained in a horizontal direction.

In the rear side of the standard is a series of holes, for adjusting the height, by changing the fulcrum-pin $f$ to a different hole; and said holes are elongated, in a horizontal direction, to allow the pin $f$ to slide horizontally, as the angle of the lever D changes, and thus accommodate itself to the movements of the parts, without binding their action.

The pawl E is pivoted to the lower part of the standard, and has a loop on its outer end, which embraces and travels on the operating-lever, and said loop engages with a series of teeth, upon the upper face of the lever, to hold the lever in position while sustaining a load.

By these means, we obtain a lifting-jack which is reliable and efficient in action, and is not liable to get twisted and strained out of shape by use.

Having thus described our invention,

What we claim as new, and desire to secure by Letters Patent, is—

The double guide $c\text{-}c$, standard B A, loop-pawl F, and serrated lever D, all constructed and operating as herein shown and described, and for the purpose set forth.

The above specification of our invention signed by us, this 20th day of February, 1869.

A. W. KEELER.
JACOB ECKERT.

Witnesses:
HIRAM G. SOULES,
F. A. MORLEY.